United States Patent Office 3,214,345
Patented Oct. 26, 1965

3,214,345
PROCESS FOR PRODUCING L-ASPARTIC ACID
Ichiro Chibata, Toyonaka, and Masahiko Kisumi, Higashinada-ku, Kobe, Japan, assignors to Tanabe Seiyaku Co., Ltd., Osaka, Japan
No Drawing. Filed Oct. 18, 1963, Ser. No. 317,139
Claims priority, application Japan, Nov. 20, 1958, 33/33,544
10 Claims. (Cl. 195—30)

This application is a continuation-in-part of application Serial No. 851,516, filed on November 9, 1959, now abandoned.

The present invention relates to a process of producing L-aspartic acid by fermentation. L-aspartic acid is an important amino acid and plays significant role with respect to amino metabolism. It has been known that aspartic acid is chemically synthesized by the reaction of ammonia with fumaric acid or with maleic acid.

The chemical process requires high temperature and pressure, and the product is not in L-form, but racemic. In addition to the chemical process, aspartic acid is also formed enzymatically from ammonia and fumaric acid by action of aspartase. Unlike the chemical process, aspartic acid formed enzymatically is in the optically active L-form, which is available for organisms.

For the production of aspartic acid it is more convenient if the growth of microorganisms and conversion of fumarate to aspartate are carried out by a single fermentative procedure. Such a fermentative procedure enabling maximum conversion of fumaric acid to aspartic acid has now been established.

According to the present invention aspartic acid is produced from fumaric acid and ammonia by employing an organism which produces aspartase and is suitable for the accumulation of aspartic acid. The microorganism is cultivated in a sugar-free medium containing fumaric acid as the source of carbon and ammonia as a main source of nitrogen. Aspartic acid formed is accumulated in the broth and readily isolated therefrom.

According to this invention, a large amount of aspartic acid can be easily produced, for microorganism growth and conversion of fumaric acid to aspartic acid are attained by a one step fermentation in a simple sugar-free medium. The use of medium which is sugar-free is a feature of this invention.

Furthermore, by-products, such as glutamic acid and alanine, adherent to ordinary fermentation procedures, are very scarce because fumaric acid is contained in the medium as sole carbon source, and the shift of pH during the culture is suitable for the accumulation of aspartic acid.

As microorganisms used in the present invention, bacteria, such as *Pseudomonas fluorescens*, *Pseudomonas aeroginosa*, *Bacillus subtilis*, *Bacillus megatherium*, *Proteus vulgaris*, *Escherichia coli*, and *Aerobacter aerogenes*, are suitable for the production of aspartic acid. Mutants of these bacteria also can be used for this invention. Molds, streptomyces and yeasts have little, if any, aspartate-forming activity and have a tendency to produce other amino acids in the fermentative procedure.

The medium employed for this invention is composed mainly of fumaric acid and ammonia. In addition to these main components a small amount of mineral salts, such as potassium phosphate, magnesium sulfate and calcium carbonate, and organic nitrogen compounds, such as meat extract, yeast extract and peptone, may be added. The use of fumaric acid as the only carbon source results in the production of L-aspartic acid without unfavorable formation of by-products. The form of ammonia used as the nitrogen source can vary. Ammonium salts, such as ammonium sulfate, ammonium phosphate and ammonium chloride can be used, but ammonium fumarate is most satisfactory for this purpose. The most suitable molar ratio of fumaric acid/ammonia in the medium is approximately 1/1 to 1/2. Shaking or stationary culture is carried out for from 2 to 10 days at from 27° to 40° C.

The pH of the cultivation medium is not critical and may be within the range under which the particular microorganism employed can start to grow. This may be easily selected or determined by those skilled in the art.

In the cultivation, the pH starts to increase during the second day and reaches 8.4 to 9.6 in the third or fourth day; this increased pH is self-maintained thereafter.

During the incubation, conversion of fumarate to aspartic acid proceeds and L-aspartic acid is accumulated in the culture broth.

The isolation of aspartic acid from the culture broth may be carried out in any suitable manner. Thus, for example, the fermentation broth may be filtered and the filtrate may be treated with active charcoal, concentrated and adjusted to a pH approximately of or substantially equal to the isoelectric point of aspartic acid so that the latter precipitates. The precipitate is collected and recrystallized from water to obtain pure acid.

A method by the use of an ion exchange resin, which is well known to those skilled in the art for purifying and isolating acidic amino acids, may be applied to the isolation of aspartic acid. Thus, a filtrate of the culture broth is treated with a weakly basic anion exchange resin to adsorb aspartic acid on the latter. Aspartic acid is then eluted from the resin and subjected to recrystallization.

According to this invention, the yield of purified L-aspartic acid may reach as much as approximately 90%.

The following examples are given solely for the purpose of illustration and are not to be construed as a limitation of this invention.

*Example 1*

The fermentation medium is as follows:

| | Percent |
|---|---|
| Sodium fumarate | 3.4 |
| Ammonium fumarate | 3.2 |
| Peptone | 0.9 |
| $K_2HPO_4$ | 0.2 |
| $MgSO_4 \cdot 7H_2O$ | 0.05 |
| $CaCO_3$ | 1.0 |
| Distilled water | Remainder |

Adjust the above medium to pH 7.0. Distribute same in 150 ml. (milliter) amounts into 400 ml. shaking flasks and sterilize by autoclaving. After inoculating the medium in each flask with two loopfuls of inoculum of *Escherichia coli* K–12, incubate the culture for 8 days with reciprocal shaking (110 r.p.m.) at 30° C. Filter the fermentation broth and boil the filtrate at pH 5 with active charcoal. Filter again for decolorization and to remove protein. Concentrate the filtrate in vacuo and allow to stand over night in a refrigerator (0° C.) at pH 3.0. Collect the formed crystals and recrystallize from water. The yield of L-aspartic acid is 3.6 g./dl. (grams/deciliter).

*Example 2*

Mutant Ki–1023 (methionine-requiring strain) derived from *Escherichia coli* K–12 is used. By the same medium and procedure as described in Example 1, 4.2 g./dl. of L-aspartic acid is obtained.

Example 3

The fermentation medium is as follows:

| | Percent |
|---|---|
| Ammonium fumarate | 6.5 |
| Peptone | 0.9 |
| $K_2HPO_4$ | 0.2 |
| $MgSO_4 \cdot 7H_2O$ | 0.05 |
| $CaCO_3$ | 1.0 |
| Distilled water | Remainder |

Adjust the above medium to pH 7.0. Distribute the medium in 150 ml. amounts into 500 ml. shaking flasks and sterilize by autoclaving. Inoculate the medium in each flask with two loopfuls of inoculum of mutant Ki-1023 derived from *Escherichia coli* K-12. Incubate the cultures at 37° C. for 1 day with reciprocal shaking and then for 3 days without shaking. Following incubation proceed as described in Example 1. The yield of L-aspartic acid is 5.0 g./dl. (87% based on fumaric acid).

Example 4

*Aerobacter aerogenes* B-1 is employed for producing aspartic acid. By using the same medium and procedure as described in Example 3, 4.7 g./dl. of L-aspartic acid is obtained.

Example 5

*Pseudomonas fluorescens* 6009-2 is grown in the following medium

| | Percent |
|---|---|
| Ammonium fumarate | 6.5 |
| Peptone | 0.9 |
| $K_2HPO_4$ | 0.2 |
| $MgSO_4 \cdot 7H_2O$ | 0.05 |
| Distilled water | Remainder |

The above medium is adjusted to pH 7.0. By using the same procedure as described in Example 3, 4.8 g./dl. of L-aspartic acid is obtained.

Example 6

The fermentation medium is as follows:

| | Percent |
|---|---|
| Ammonium fumarate | 3.2 |
| Sodium fumarate | 3.5 |
| Peptone | 0.2 |
| Yeast extract | 0.5 |
| $K_2HPO_4$ | 0.2 |
| $MgSO_4 \cdot 7H_2O$ | 0.05 |
| Distilled water | Remainder |

Adjust the above medium to pH 7.0 and distribute same in 200 ml. amounts into 500 ml. flasks. Sterilize medium in each flask by autoclaving. Inoculate sterilized medium in each flask with two loopfuls of inoculum of *Pseudomonas fluorescens* 6009-2. Carry out stationary culture at 30° C. for 5 days. After culturing follow procedure described in Example 1. Yield of aspartic acid is 3.7 g./dl.

Example 7

*Pseudomonas aeruginosa* NK is employed. By the same medium and procedure as described in Example 3, 4.5 g./dl. of L-aspartic acid is obtained.

Example 8

*Proteus vulgaris* 8144 is employed. By the same medium and procedure as described in Example 3, 3.5 g./dl. of L-aspartic acid is obtained.

Example 9

*Bacillus megatherium* is employed. By the same medium and procedure as described in Example 3, except that the culture is incubated for 1 day with reciprocal shaking and then 2 days without shaking, 3.0 g./dl. of L-aspartic acid is obtained.

An important and critical feature of this invention is that the fermentation media be sugar-free. It is thought that the invention and its advantages will be understood from the foregoing description, and it is apaprent that various changes may be made in the process without departing from the spirit and scope of the invention or sacrificing its material advantages, the process hereinfore described being merely illustrative of preferred embodiments of the invention.

What is claimed is:

1. A one-phase process for the fermentative production of L-aspartic acid which comprises producing aspartase by the fermentation of a member selected from the group consisting of aspartase-forming strains of *Escherichia coli*, *Aerobacter aerogenes*, *Pseudomonas fluorescens*, *Pseudomonas aeruginosa*, *Proteus vulgaris* and *Bacillus megatherium* in a sugar-free nutrient medium containing fumaric acid and ammonia at a temperature within the range from 27° C. to 40° C. and at an initial pH of 7.0 for a period of from 2 to 10 days, and concomitantly converting fumaric acid into L-aspartic acid in the same fermentation medium by the action thereon of the resultant aspartase, whereby L-aspartic acid is selectively obtained substantially quantitatively, and isolating the thus-produced L-aspartic acid from the the fermentation broth.

2. A process according to claim 1, wherein the molar ratio of fumaric acid to ammonia in the fermentation medium is approximately 1:1 to 2:1.

3. A one-phase process for the fermentative production of L-aspartic acid which comprises producing aspartase by the fermentation of an as partase-forming strain of *Escherichia coli* in a sugar-free nutrient medium containing fumaric acid and ammonia at a temperature within the range from 27° C. to 40° C. and at an initial pH of 7.0 for a period of from 2 to 10 days, and concomitantly converting fumaric acid into L-aspartic acid in the same fermentation medium by the action thereof of the resultant aspartase, whereby L-aspartic acid is selectively obtained substantially quantitatively, and isolating the thus-produced L-aspartic acid from the fermentation broth.

4. A one-phase process for the fermentative production of L-aspartic acid which comprises producing aspartase by the fermentation of an aspartase-forming strain of *Aerobacter aerogenes* in a sugar-free nutrient medium containing fumaric acid and ammonia at a temperature within the range from 27° to 40° C. and at an initial pH of 7.0 for a period of from 2 to 10 days, and concomitantly converting fumaric acid into L-aspartic acid in the same fermentation medium by the action thereon of the resultant aspartase, whereby L-aspartic acid is selectively obtained substantially quantitatively, and isolating the thus-produced L-aspartic acid from the fermentation broth.

5. A one-phase process for the fermentative production of L-aspartic acid which comprises producing aspartase by the fermentation of an aspartase-forming strain of *Pseudomonas fluorescens* in a sugar-free nutrient medium containing fumaric acid and ammonia at a temperature within the range from 27° to 40° C. and at an initial pH of 7.0 for a period of from 2 to 10 days, and concomitantly converting fumaric acid into L-aspartic acid in the same fermentation medium by the action thereon of the resultant aspartase, whereby L-aspartic acid is selectively obtained substantially quantitatively, and isolating the thus-produced L-aspartic acid from the fermentation broth.

6. A one-phase process for the fermentative production of L-aspartic acid which comprises producing aspartase by the fermentation of an aspartase-forming strain of *Pseudomonas aeruginosa* in a sugar-free nutrient medium containing fumaric acid and ammonia at a temperature within the range from 27° C. to 40° C. and at an initial pH of 7.0 for a period of from 2 to 10 days, and concomitantly converting fumaric acid into L-aspartic acid in the same fermentation medium by the action thereof of the resultant aspartase, whereby L-aspartic acid is selectively obtained substantially quantitatively, and isolating the thus-produced L-aspartic acid from the fermentation broth.

7. A one-phase process for the fermentative production of L-aspartic acid which comprises producing aspartase by the fermentation of an aspartase-forming strain of *Proteus vulgaris* in a sugar-free nutrient medium containing fumaric acid and ammonia at a temperature within the range from 27° C. to 40° C. and at an initial pH of 7.0 for a period of from 2 to 10 days, and concomitantly converting fumaric acid into L-aspartic acid in the same fermentation medium by the action thereon of the resultant aspartase, whereby L-aspartic acid is selectively obtained substantially quantitatively, and isolating the thus-produced L-aspartic acid from the fermentation broth.

8. A one-phase process for the fermentative production of L-aspartic acid which comprises producing aspartase by the fermentation of an aspartase-forming strain of *Bacillus megatherium* in a sugar-free nutrient medium containing fumaric acid and ammonia at a temperature within the range from 27° C. to 40° C. and at an initial pH of 7.0 for a period of from 2 to 10 days, and concomitantly converting fumaric acid into L-aspartic acid in the same fermentation medium by the action thereof of the resultant aspartase, whereby L-aspartic acid is selectively obtained substantially quantitatively, and isolating the thus-produced L-aspartic acid from the fermentation broth.

9. A one-phase process for the fermentative production of L-aspartic acid which comprises producing aspartase by the fermentation of a member selected from the group consisting of aspartase-forming strains of *Escherichia coli*, *Aerobacter aerogenes*, *Pseudomonas fluorescens*, *Pseudomonas aeruginosa*, *Proteus vulgaris* and *Bacillus megatherium* in a sugar-free nutrient medium comprising fumaric acid, ammonia, organic nitrogen source and mineral salts at a temperature within the range from 27° C. to 40° C. and at an initial pH of 7.0 for a period from 2 to 10 days, and concomitantly converting fumaric acid into L-aspartic acid in the same fermentation medium by the action thereon of the resultant aspartase, whereby L-aspartic acid is selectively obtained substantially quantitatively, and isolating the thus-produced L-aspartic acid from the fermentation broth.

10. In one-phase fermentative production of L-aspartic acid by fermenting an aspartase-forming strain of microorganism in a nutrient medium, the improvement wherein the microorganism is a member selected from the group consisting of *Escherichia coli*, *Aerobacter aerogenes*, *Pseudomonas fluorescens*, *Pseudomonas aeruginosa*, *Proteus vulgaris* and *Bacillus megatherium* and the nutrient medium is a sugar-free medium comprising fumaric acid and ammonia.

References Cited by the Examiner

UNITED STATES PATENTS 2,927,059 3/60 Good et al. _____ 192—29
2,971,890 2/61 Ogawa et al. _____ 195—30

OTHER REFERENCES

Kisumi et al., article in Bulletin of the Agricultural Chemical Society of Japan, vol. 24, No. 3, pages 296–305, 1960.

A. LOUIS MONACELL, *Primary Examiner.*